United States Patent
Powell (10) Patent No.: US 7,589,900 B1
(45) Date of Patent: Sep. 15, 2009

(54) EYEBOX SHAPING THROUGH VIRTUAL VIGNETTING

(75) Inventor: Karlton D. Powell, Lake Stevens, WA (US)

(73) Assignee: Microvision, Inc., Redmond, WA (US)

( * ) Notice: Subject to any disclaimer, the term of this patent is extended or adjusted under 35 U.S.C. 154(b) by 86 days.

(21) Appl. No.: 12/045,987

(22) Filed: Mar. 11, 2008

(51) Int. Cl.
*G02B 27/10* (2006.01)

(52) U.S. Cl. .................................. 359/626; 359/622

(58) Field of Classification Search ............. 359/213.1, 359/225.1, 291, 292, 621, 622, 626
See application file for complete search history.

(56) References Cited

U.S. PATENT DOCUMENTS

2009/0161191 A1* 6/2009 Powell .................. 359/207.7

* cited by examiner

*Primary Examiner*—David N Spector
(74) *Attorney, Agent, or Firm*—Kevin D. Wills (57) ABSTRACT

Briefly, in accordance with one or more embodiments, a compressed microlens array comprises an array of lenslets arranged in the array to have the lenslet centers spaced apart at a first distance in a first direction and to have the lenslet centers spaced apart at a second distance in a second direction such that the first direction is greater than the second direction. A raster scan of an image projected onto the array of lenslets results in the image being displayed in an eyebox having an aspect ratio having a length in the first direction being longer than a length in second direction via virtual vignetting of the diffraction patterns resulting from the raster scan.

36 Claims, 9 Drawing Sheets

EYEBOX SHAPING THROUGH VIRTUAL VIGNETTING

BACKGROUND

In a head-up display (HUD), an image is projected into an eyebox region such that the viewer is able to view the displayed image when the viewer's eyes are positioned within the eyebox, and is unable to view the displayed image when the viewer's eyes are not positioned within the eyebox. In general, the inpterpupilary distance (IPD), the distance between the pupils of the eyes, tends towards a desire to make the eyebox wider than it is tall so as to provide better viewability of the displayed image. The concept of providing an eyebox with a wider angle viewing aspect ratio may be applicable to scanned beam displays where the viewer's head is free to move relative to the image displayed in the eyebox. For example, it may be desirable to provide a display system where the eyebox has an aspect ratio on the order of 2:1 or so, and/or which may be based on, for example, the number of pixels in the displayed image such as 800 by 600, a 16 by 9 aspect ratio, and so on.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
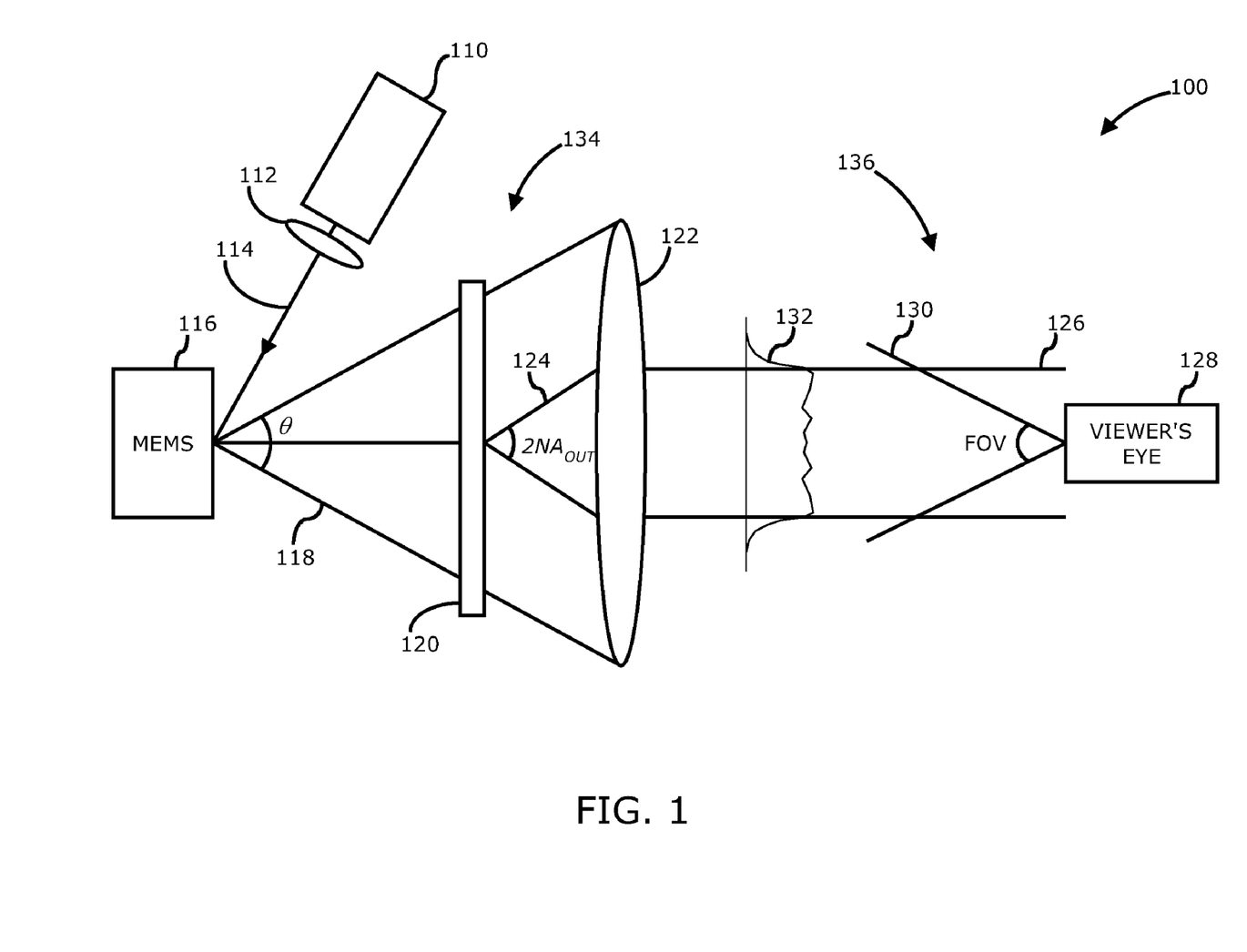
FIG. 1 is a diagram of a scanned beam display capable of providing a desired eyebox aspect ratio in accordance with one or more embodiments.

Referring now to FIG. 1, a diagram of a scanned beam display capable of providing a desired eyebox aspect ratio in accordance with one or more embodiments will be discussed. As shown in FIG. 1, a typical scanned beam display 100 may comprise a laser source 110 capable of emitting a laser beam 114 to be scanned into a displayed image by a microelectromechanical system (MEMS) based scanner 116. Laser source 110 may comprise, for example, a vertical-cavity surface-emitting laser (VCSEL) or the like. MEMS scanner 116 may comprise one or more mirrors disposed on a platform capable of moving in response to an applied voltage to reflect laser beam 114 into a predetermined raster scan 118. In one or more embodiments, scanned beam display 100 may further include beam shaping optics 112 to shape the laser beam 114 emitted by laser source 110. For example, the shape of the laser beam 114 emitted from laser source 110 may be generally elliptical in shape, and beam shaping optics 112 may comprise a circularizer for causing the beam profile 112 to be generally circular in shape after being circularized by beam shaping optics 112. Likewise, beam shaping optics 112 may comprise a top hat lens to cause the profile of the beam, emitted by laser source 110 to be generally flattened in shape from a natural Gaussian type profile as emitted from a typical laser source 110 although the scope of the claimed subject matter is not limited in this respect. In one or more embodiments, other various beam profiles may be utilized, for example an apodized sinc function and/or other arbitrary beam profiles as long as the appropriate size and clipping aperture are determined for best uniformity across eyebox 126, while maintaining minimized raster ripple. Although a Gaussian beam profile may provide system simplicity, using an apodized sinc may enhance the modulation transfer function (MTF) of scanned beam display 100, although the scope of the claimed subject matter is not limited in this respect.

In one or more embodiments, the laser beam 114 is reflected by MEMS scanner 116 to generate a raster scan 118 projected onto an exit pupil expander (EPE) 120. The maximum total beam deflection angle capable of being produced by MEMS scanner 116 may be referred to as θ. Where MEMS scanner 116 has a scan mirror size of D, which may also refer to the clipping aperture, for a given image size of L, the relationship of θ to the input numerical aperture $NA_{IN}$ at MEMS scanner 116 may be givens as:

$$2LNA_{IN}=D\theta$$

In one or more embodiments, exit pupil expander 120 may comprise an array of lenses, for example a microlens array (MLA). In one embodiment, the array may comprise any element or cell having a particular transfer function, and is not limited to a microlens array. Likewise, EPE 120 may comprise a dual MLA formed by two adjacent MLAs. In one or more embodiments, the array may comprise a periodic array of elements or cells, also referred to as lenslets, and in one or more alternative embodiments the array may comprise multiple elements that monotonically increase or decrease in spacing across the array, and or otherwise smoothly vary in spacing across the array, along any dimension of the array, and the scope of the claimed subject matter is not limited in this respect. When the reflected beam raster 118 is scanned across exit pupil expander 120, the image to be displayed from exit pupil expander 120 may be relayed by the projection optics 122 to form a viewing eyebox, or exit pupil, such that the image to be displayed appears at a distance, typically 2-3 meters for a head-up display (HUD), away from the location of the viewer's eye 128. In some embodiments, exit pupil expander 120 and/or projection optics 122 may be located at or near the vicinity of MEMS scanner 116, such as where scanned beam display 100 comprises a head-up display (HUD) in a vehicle or the like, for example where the image is reflected off the windshield of the vehicle and back to the viewer's eye 128. In some particular embodiments, exit pupil expander 120 may be disposed in, on, or near the windshield. In one or more alternative embodiments, one or more of exit pupil expander 120 and/or projection optics 122 may be disposed near the viewer's eye 128, for example where projection optics 122 comprises an ocular at or near the viewer's eye, such as suspended by a head band worn by the viewer, and/or disposed in a visor of a head band or helmet worn by the viewer. However, these are merely example arrangements of exit pupil expander 120 and projection optics 122, and the scope of the claimed subject matter is not limited in these respects.

Exit pupil expander 120 is capable of expanding, or converting, the numerical aperture (NA) from the numerical aperture input at MEMS scanner 116. In such embodiments, exit pupil expander 120 may provide NA conversion at an intermediate image plane to achieve a larger exit pupil. As shown in FIG. 1, the full exit cone angle due to the expanded NA output 124 of exit pupil expander can be represented by approximately twice the output NA ($2NA_{OUT}$). The size, L, of the image at exit pupil expander 120 is equal to the product of image resolution and pixel size. The expanded NA output 124 is relayed by projection optics 122 to result in an eyebox 126 in which the projected image is capable of being viewed by the viewer's eye 128, so that the projected image is generally viewable when the viewer's eye 128 is located within eyebox 126, and is generally not viewable when the viewer's eye 128 is located outside of eyebox 126. While the viewer's eye 128 is located within the eyebox 126, the viewer is capable of viewing the image in a field of view (FOV) 130 defined by, among other things, the projection optics 122. The relationship between the output numerical aperture, exit pupil diameter (EP) and the field of view is defined as:

$$LNA_{OUT}=EPsin(FOV/2)$$

The image is generally viewed by the viewer as a planar image based on a diffraction pattern 132 of beamlets generated by raster scan 118 on exit pupil expander 120. The resulting diffraction pattern 132 may be based at least in part on the characteristics the beam profile of laser beam 114, the scanning capabilities and addressability of MEMS scanner 116, the characteristics of exit pupil expander 120 and the relationships between exit pupil expander 120 and raster scan 118 impinging on the lenses of exit pupil expander 120, for example beam spot size, Fill Factor, and so on, although the scope of the claimed subject matter is not limited in these respects. In one or more embodiments, scanned beam display 100 may be configured to operate where the beam profile of laser beam 114 is generally Gaussian in shape, which may be a natural beam profile of the laser beam 114 generated by laser source 110. In such a configuration, beam shaping optics 112 may not require a top hat lens to shape the beam profile of the emitted laser beam 114. In one or more embodiments, a near field 134 region of the scanned beam display 100 may be defined as the optical pathway in the region comprising exit pupil expander 120, which can be considered located at a conjugate image plane of the source, and a far field 136 may be defined as a region defined by eyebox 126, where field of view 130 formed by projection optics 122 can be seen by the viewer's eye 128, wherein eyebox 126 is typically at an image conjugate plane of MEMS scanner 116, although the scope of the claimed subject matter is not limited in this respect.

In one or more embodiments, a periodic EPE 120 may be utilized in scanned beam display 100 to result in constant beamlet spacing, however the transmission function of a given lens cell, or lenslet, of EPE 120 determines the resulting diffraction envelope 132 due to the cell and thus the level of beamlet-to-beamlet uniformity. Note that diffraction pattern and diffraction envelope have been used interchangeably herein. In some instances, the diffraction envelope may result from a single cell transmission function, while the interference of overlapping diffraction envelopes coming from neighboring cells gives rise to interferences, thus forming the diffraction orders, or beamlets. For diffraction patterns containing many beamlets, the diffraction envelope can be approximately visualized by drawing an envelope through the peaks of all beamlets. Where scanned beam display 100 is designed to allow the viewer's head to move freely within the eyebox 126, the relationship between the input beam profile and shape characteristics and the transmission function of EPE 120 is taken into account in order to achieve a display without significant visible coherent artifacts. A periodic EPE 120 may be utilized in scanned beam display 100 to achieve such a higher level of beamlet-to-beamlet uniformity. While a periodic EPE 120 array is capable of eliminating random speckle artifacts, periodic beamlet diffraction pattern 132 at the eyebox 126 as a result of ordered interference still may be subject to coherent artifacts such as intensity gaps between beamlets and/or beamlet intensity overlap. For head-free type scanned beam display 100, these coherent artifacts may result in two undesirable visual effects: an intensity tiling pattern, or simply tiling, that appears across the FOV 130, but is not mapped to the FOV 130, and/or a Moiré pattern that appears across the FOV 130, caused by aliasing between the pitch of EPE 120 and the line spacing of raster scan 118. In general, scanned beam display 100 may be designed to minimize such tiling and/or Moiré artifacts, although the scope of the claimed subject matter is not limited in these respects.

In one or more embodiments, once scanned beam display 100 is configured to achieve beamlet-to-beamlet uniformity, beam controls, may be utilized to reduce and/or limit these coherent artifacts of tiling and/or Moiré to achieve a high level of display uniformity and image stability. Such beam controls may involve constraints on the beam parameters and may be summarized as follows: beam shape at the system clipping aperture, beam profile across the system clipping aperture, and/or beam focus NA. In one or more embodiments, the pitch of the elements EPE 120 (EPE pitch), and/or beam wavelength may also be taken into consideration when determining the quantities of these parameters. For instance, exit pupil pattern uniformity may be consistent and independent of spot position for spot sizes larger than the EPE pitch, but may be dependent on spot position for spot sizes smaller than the EPE pitch, or cell size. Moiré can occur for the latter case since exit pupil uniformity from a given spot location, or from a given field point within the image, emanates a different intensity toward the viewer's eye depending on the spot location within the illuminated cell in EPE 120. As it typically may be undesirable to require registration of the raster with the EPE 120 due to raster trajectory artifacts, such as raster pinch, aliasing between the pitch layout of EPE 120 and/or the line spacing of raster scan 118 may introduce a Moiré intensity pattern across FOV 130. Where the spot size of beam 114 is larger than the cell size of EPE 120, the overall diffraction envelope 132 of the exit pupil pattern is relatively stable versus spot position at the plane of EPE 120, but intensity gaps may form between beamlets within the exit pupil pattern as the spot grows beyond the cell size. A larger spot size can illuminate more neighboring cells in EPE 120, thereby increasing the number of exposed equally spaced scatter centers, each of which may be approximately collimated by projection optics 122 at very slightly different, but equally spaced angles toward the viewer's eye 128. In an extreme case the result may be considered similar to the N−1 extinctions formed across the interference region of N-equally-spaced beams, forming gaps in the areas exhibiting destructive interference. Consequently, for the case where the spot size of laser beam 114 is larger than the cell size of EPE 120, each resulting beamlet NA is on the order of the input beam NA.

In one or more embodiments, a fill factor of F=1 represents a spot formed by an NA that contains energy out to an angle that matches the NA subtended by a single diffraction order spacing, and thus the spacing of a single beamlet within the exit pupil. Although fill factor is independent of beam profile of laser beam 114, a typical spot size for the case of F=1 would be on the order of the cell size of EPE 120. Where intensity gapping occurs, a visible intensity tiling pattern, which is a coherent artifact, appears across FOV 130 that is not mapped to FOV 130 in angle, and so the tiling pattern appears to move in the background of the image upon movement of the viewer's head. The tiling pattern is formed by intensity variation across beamlets within the exit pupil, and which may appear to be somewhat smoothed to the viewer's eye 128 due to integration by the eye pupil, which comprises a convolution of the beamlet pattern with eye pupil size. As more beamlets are captured through an eye pupil, uniformity of the image can appear improved. However this may imply that for a given beamlet density uniformity may improve when the brightness is reduced so as to allow the eye pupil to increase in size. Increasing beamlet density at the exit pupil can be achieved by using lower angular resolution. However such a design of scanned beam display 100 may not be acceptable for higher angular resolution specification of scanned beam display 100. Thus, in one or more embodiments EPE pitch may be selected based at least in part on a desired resolution. Where scanned beam display system 100 is designed to have a higher angular resolution, laser beam 114 may be tailored using beam controls to achieve higher uniformity with reduced coherent artifacts. In one or more embodiments, scanned beam display system 100 may utilize an EPE 120 comprising a compressed microlens array capable of providing a desired eyebox aspect ratio. Such compressed microlens arrays are shown in and described with respect to FIG. 2 through FIG. 7, below.

Figure 2:
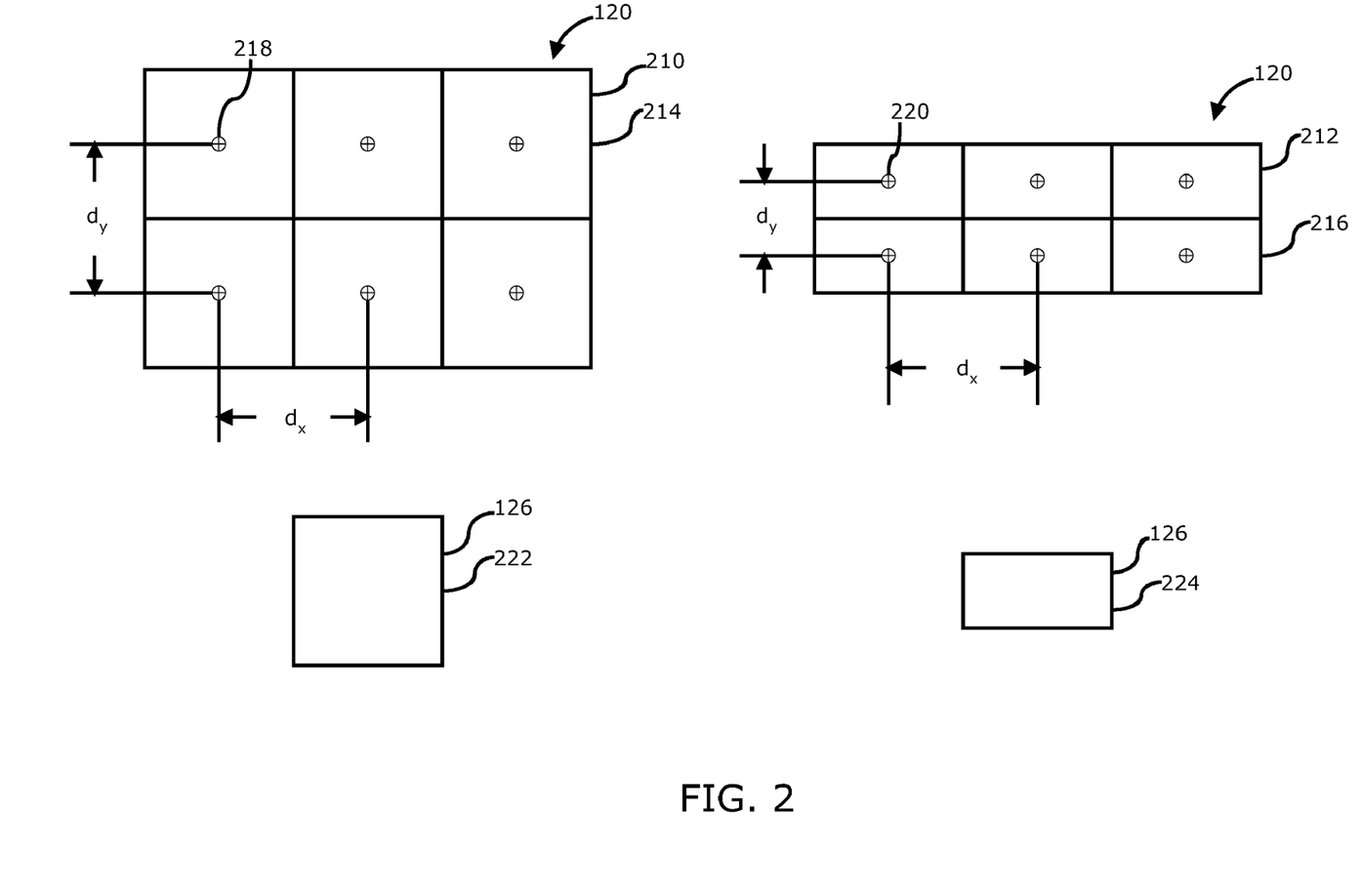
FIG. 2 is a diagram of a compressed microlens array having respective square and rectangular lenslets for a scanned beam display capable of providing a desired eyebox aspect ratio in accordance with one or more embodiments.

Referring now to FIG. 2, a diagram of a compressed microlens array having rectangular lenslets for a scanned beam display capable of providing a desired eyebox aspect ratio in accordance with one or more embodiments will be discussed. As shown in FIG. 2, an exit pupil expander 120 may comprise a microlens array 210 comprising an array of generally square shaped lenslets 214 having centers 218 as shown. In such a microlens array 210, the vertical distance $d_y$ between centers 218 of lenslets 214 is approximately equal to the horizontal distance $d_x$ between centers 218 of lenslets 214. In general, a microlens array 210 comprising an array of generally square shaped lenslets 214 may result in a corresponding eyebox 126 having a generally square shape 222. Such an eyebox 126 has an aspect ratio approximately equal to one.

Figure 3A:
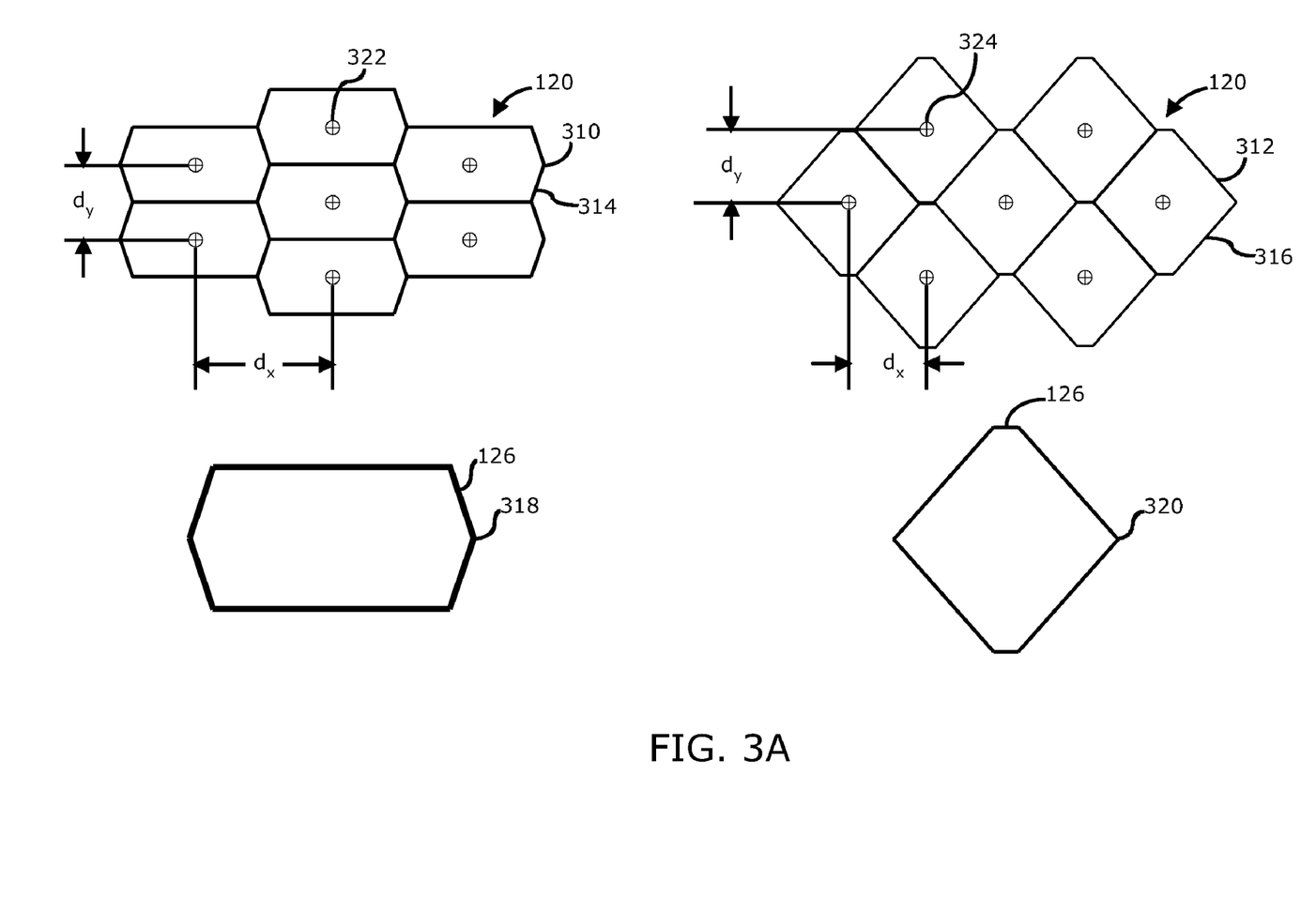
FIGS. 3A and 3B are diagrams of alternative compressed microlens array having compressed hexagonal lenslets as shown in FIG. 3A and non-compressed hexagonal lenslets as shown in FIG. 3B for a scanned beam display capable of providing a desired aspect ratio in accordance with one or more embodiments.
Figure 3B:
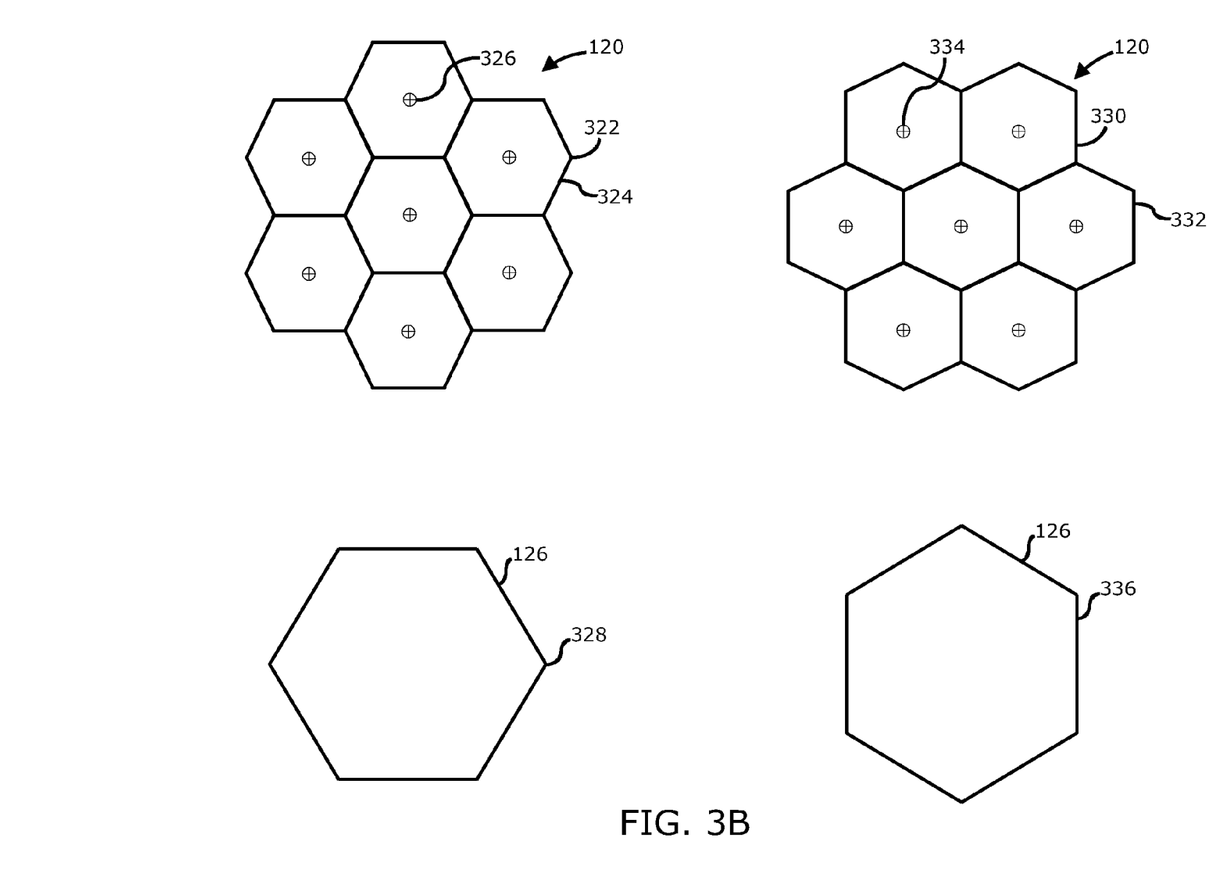

In order to provide an eyebox 126 having an aspect ratio closer to a typical display, for example approximately a 2:1 aspect ratio, an 800 by 600 pixel aspect ratio, a 16 by 9 aspect ratio, and so on, an exit pupil expander 120 may be designed to have a compressed microlens array 212. In one embodiment, rather than using generally square shaped lenslets 214, compressed microlens array 212 may comprise an array of generally rectangular shaped lenslets 216. In such an arrangement, the vertical distance $d_y$ between centers 220 of lenslets 216 may in general be less than the horizontal distance $d_x$ between centers 220 of lenslets 216. In general, a compressed microlens array 212 may result in a corresponding eyebox 126 having a generally rectangular shape 224 in order to provide eyebox 126 with a desired aspect ratio, for example having a width that is generally greater than its height. Thus, in one or more embodiments, the resulting shape of eyebox 126 may be designed to have a desired aspect ratio based at least in part on the shape of the lenslets 216 of the microlens array 212 used in EPE 120. Since the shape of the lenslets 216 is capable of producing a desired shape and/or aspect ratio of eyebox 126, other shapes of lenslets 216 may be utilized to provide a resulting eyebox 126 shape, for example as shown in and described with respect to FIG. 3, below.

In one or more embodiments, the desired shape of eyebox 126 may be based at least in part on the geometry of the lenslets 214 of microlens array 210. As will be discussed in further detail with respect to FIG. 4 and FIG. 5, below, beam spots from raster scan 118 pass through individual lenslets 210, the lenslets function as clipping apertures to shape and quantize the beam into beam partitions. It should be noted that beamlets appearing at the eyebox 126 are caused by interference due to the overlap of the envelopes formed by these beam partitions cut up into buckets of energy at the EPE 120 as the beam from the raster scan 118 passes through the individual lenslets 210 wherein the amount and shape of the clipping is a function of the geometry of the lenslets 210. As a result, when the beam partitions combine in the eyebox 126 to form diffraction patterns, the resulting diffraction patterns combined to form a resulting eyebox 126 shape formed from the combination of clipped beam partitions. Thus, the desired shape of eyebox 126 may be achieved by such vignetting of the resulting beamlets via the clipping function of the individual lenslets when the diffraction patterns are combined at the eyebox 126 while maintaining high efficiency. In one or more embodiments, the term virtual vignetting at utilized herein refers to achieving the effects of physical vignetting for the optical system without suffering clipping losses that may otherwise occur with physical vignetting. The term virtual vignetting may also refer to in general the intentional shaping of eyebox 126. Thus, the eyebox 126 may be shaped by such vignetting at the exit pupil expander 120 via the design of the microlens array 210 or 212 (or 310 or 312) of the EPE 120. In other words, virtual vignetting of the eyebox 126 may be achieved by only supplying the projection relay optics 122 of the scanned beam display 100 with the desired input acceptance cone NA from all field points from microlens array 210 or 212 (or 310 or 312) of EPE 120, thus enabling only the intended eyebox 126 shape and volume by design. Such an arrangement of eyebox 126 via virtual vignetting may also reduce or eliminate swimming artifacts by eliminating light outside the design angles of the projection relay optics 122. It may also limit scatter and contrast loss in the display image quality by providing the necessary effects of physical vignetting without actually requiring clipping of the light at some location within the display system. Thus, in one or more embodiments, microlens array 210 or 212 (or 310 or 312) may be compressed to have an aspect ratio generally on the order of 2:1, although variations from a 2:1 ratio may also be provided according to the application design, for example where the display may comprise 800 by 600 pixels, where a 16:9 ratio is designed, and so on, and the scope of the claimed subject matter is not limited in this respect. In general, the aspect ratio of the eyebox 126 can be designed independently of the FOV aspect ratio of the display. In general, the resulting eyebox 126 may have an aspect ratio where the horizontal dimension is longer than the vertical dimension. Thus, microlens array 210 or 212 (or 310 or 312) may be designed to be compressed to have such an aspect ratio where the width is greater than its height by compressing the layout of the lenslet centers 218 or 220 of the array. In one embodiment, lenslets 214 or 216 may have anamorphic profiles. In one or more alternative embodiments, the focal length of the lenslets 214 or 216 may be the same in both orthogonal horizontal and vertical directions. Furthermore, microlens array 210 or 212 may be transmissive or reflective and may provide non-radially symmetric exit cones 124 from EPE 120 in order to achieve the eyebox 126 to have a desired aspect ratio, for example a 2:1 aspect ratio. Such a designed microlens array 210 or 212 (or 310 or 312) may be referred to as a compressed microlens array (MLA). Thus, by using a compressed MLA, the shape of eyebox 126 maybe tailored to a desired aspect ratio having a particular geometry, for example the shape of eyebox 126 may comprise a rectangle, a compressed hexagon, an ellipse, and so on. For elliptical shapes, a true elliptical lenslet shape does not pack 100% by geometry, which may also be true for other shapes as well, however in such an embodiment the unfilled gap regions could be masked off to actually allow the generation of a true, or nearly true, elliptically shaped eyebox output. Examples of such alternative shapes of eyebox 126 achieved via a compressed MLA are shown in and described with respect to FIG. 3, below.

Referring now to FIGS. 3A and 3B, diagrams of alternative compressed microlens arrays having hexagonal lenslets as shown in FIG. 3A and non-compressed microlens arrays having hexagonal lenslets as shown in FIG. B for a scanned beam display capable of providing a desired aspect ratio in accordance with one or more embodiments will be discussed. As an alternative to using rectangular shaped lenslets 216 in a compressed microlens array 212, other shapes of lenslets may be utilized such as hexagonal shaped lenslets 314 or rotated hexagonal shaped lenslets 316 as shown in FIG. 3. For example, EPE 120 may comprise a microlens array 310 comprising a compressed array of hexagonal shaped lenslets 314 to result in eyebox 126 having a general compressed hexagonal shape 318. As with the rectangular shaped lenslets 216 as shown in FIG. 2, hexagonal shaped lenslets 314 may be compressed in one direction with respect to another orthogonal direction to provide a compressed hexagonal shape 318 to eyebox 126. Thus, the vertical spacing $d_y$ between centers 322 of lenslets 314 may be less than the horizontal spacing between centers 322 of lenslets 314 to provide a generally compressed hexagonal shape 318 to eyebox 126 such that eyebox 126 has an aspect ratio where its horizontal width is longer than its vertical height.

Similarly, exit pupil expander 120 may comprise a compressed microlens array 312 comprising an array of rotated hexagonal shaped lenslets 316. The resulting eyebox 126 may then generally comprise a generally rotated hexagonal shape 320. Likewise, the overall aspect ratio of the resulting compressed rotated hexagonal eyebox 320 may be designed by selecting the ratio of the vertical spacing $d_y$ between centers 324 of rotated hexagonal lenslets 316 to the horizontal spacing $d_x$ between centers 324 of rotated hexagonal lenslets. In general, any shape of lenslet and ratio of vertical distance to horizontal distance between the centers of the lenslets may be selected to result in a desired shape and/or aspect ratio of the eyebox 126, and the scope of the claimed subject matter is not limited to any particular lenslet shape, vertical and/or horizontal spacing, and/or aspect ratio. For example, the lenslets of the microlens array may comprise elliptical shaped elements, octagonal shaped elements, and so on, and the scope of the claimed subject matter is not limited in these respects. For comparison with the compressed hexagonal arrays 310 and 312 as shown in FIG. 3A, FIG. 3B shows resulting eyeboxes 126 having a non-compressed hexagonal shape 328 and a non-compressed rotated hexagonal shape 336 from respective non-compressed hexagonal array 322 of non-compressed hexagonal lenslets 324 and non-compressed rotated hexagonal array 330 of non-compressed rotated hexagonal lenslets 332. In such arrangements as shown in FIG. 3B, centers 326 of lenslets 324 and/or centers 334 of lenslets 332 may be generally equidistantly spaced with respect to the nearest neighboring centers 326.

Figure 4:
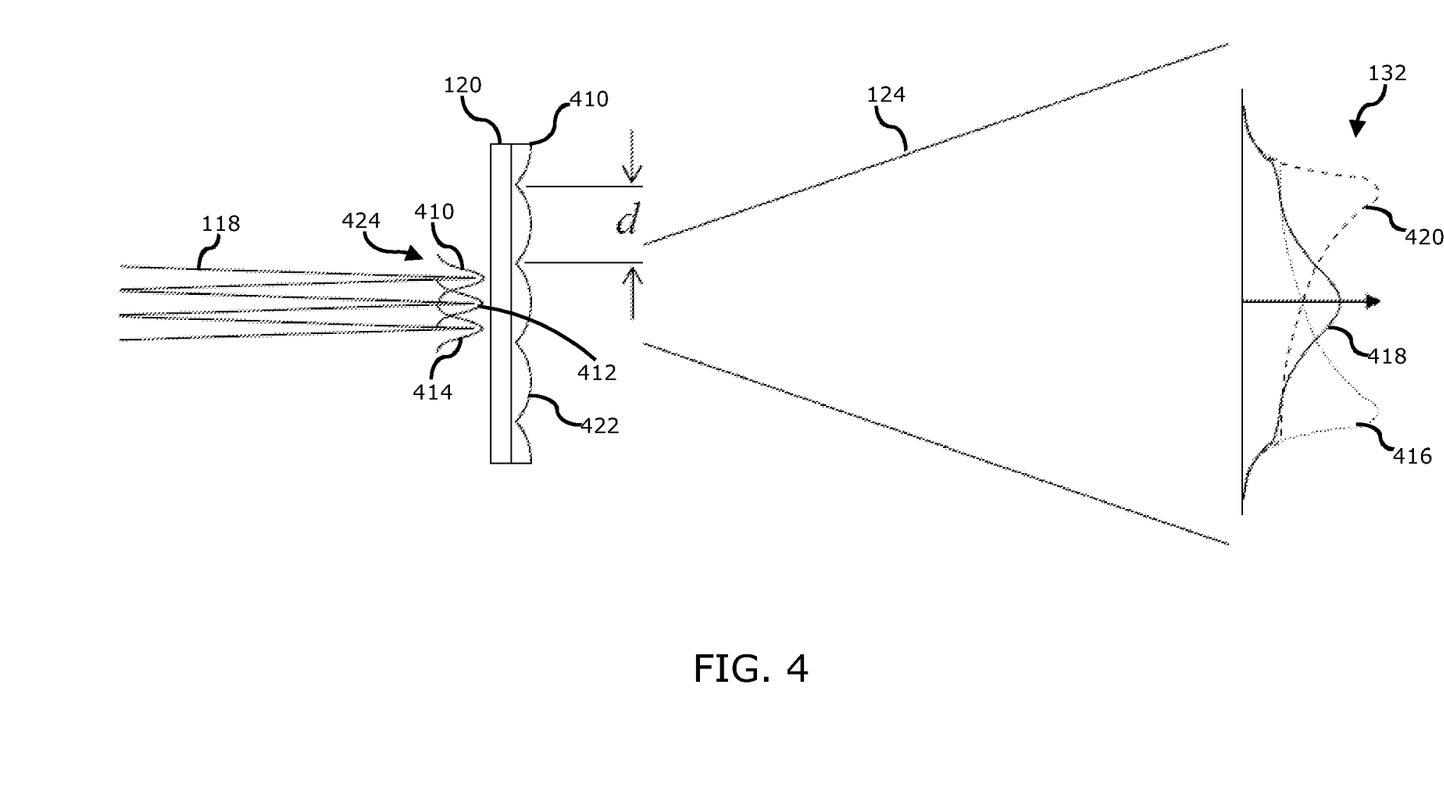
FIG. 4 is a diagram of an example time-averaged diffraction envelope resulting from a beamlet beam profile scanned across a displayed image having a desired eyebox aspect ratio in accordance with one or more embodiments.

Referring now to FIG. 4, a diagram of an example time-averaged diffraction envelope resulting from a beamlet beam profile scanned across a displayed image having a desired eyebox aspect ration in accordance with one or more embodiments will be discussed. FIG. 4 illustrates how individual beamlets 424 having corresponding spot profiles 410, 412, and 414 from raster scan 118 are affected by microlens array 410 of EPE 120 to form individual diffraction patterns 416, 418, and 420 that combine in exit cone 124 into an overall diffraction pattern 132 based at least in part on the geometry of lenslets 422 of which microlens array 410 comprises. As shown in FIG. 4, raster scan 118 may address one or more lenslets 422 of microlens array 410 in exit pupil expander 120, for example by scanning across MLA 410 two or more scan lines for a given lenslet 422. The beam profile of laser beam 114 used to generate raster scan 118 may comprise, for example, a Gaussian beam profile to generate near-Gaussian shaped spot profiles 410, 412, and 414 for each scan line per lenslet 422. The resulting diffraction pattern for any single one of spot profiles 410, 412, and/or 414, when considered alone, may result in underfilling the diffraction envelope with energy in such a way that is spot position dependent, and as a result an aliasing, or beating pattern, may occur between the array pitch of EPE 120 the line spacing of raster scan 118, thereby causing Moiré artifacts across the displayed image. For example, spot profile 410 may result in a corresponding diffraction pattern 416 which exhibits a skew in intensity toward the lower end of diffraction pattern 132, with less intensity toward the middle or upper end of diffraction pattern 132. For a given eye location within the eyebox 126, this intensity skew may result in an apparent ripple, or fringe, in the Moiré pattern in the displayed image. Likewise, spot profile 412 results in a diffraction pattern 418 having greater intensity in the middle and less intensity in the lower or upper ends of diffraction pattern. Similarly, spot profile 414 may result in diffraction pattern 420 having greater intensity at the upper end of diffraction pattern 132, and less intensity at the middle or lower end of diffraction pattern. Thus, if Gaussian beams are used having Fill factor greater than F=1, such that the spot profiles formed at the raster scan 118 are smaller than the lenslet pitch, and the addressability $A=d/l_s$ for EPE pitch d and line spacing $l_s$, is set to A=1, meaning on average there is only about a single scan line per lenslet 412 in EPE 120, the resulting diffraction pattern 132 may not be even and thereby generate Moiré artifacts in the displayed image. However, in one or more embodiments, the spot energy may be distributed evenly within a cell or lenslet 422 over time so that raster scan 118 may provide more than one scan line per lenslet 422 to provide an addressability of A>1. An addressability of A>1 may be accomplished by providing additional addressability with MEMS scanner 116 when defining display pixel size p on order of EPE pitch d. By doing so, raster scan 118 will result in two or more scan lines per lenslet 422 so that over time, individual corresponding diffraction patterns 416, 418, and 420 resulting from spot profiles 410, 412, and 416 will combine to result in an overall diffraction pattern 132 that is sufficiently constant over the entire diffraction envelope 132 to reduce or minimize the Moiré effect in the displayed image. Thus, in one or more embodiments, if a Gaussian beam profile is utilized, Moiré artifacts may be effectively reduced or eliminated by utilizing additional addressability of MEMS scanner 116 to cause raster scan 118 to provide more than one scan line per lenslet 312 to have an addressability of A>1, however the scope of the claimed subject matter is not limited in this respect. Thus, the overall shape of diffraction pattern 132, and thus the resulting shape of eyebox 126, may be tailored via shaping of the individual diffraction patterns 416, 418, and 420, via shaping of the geometry of lenslets 422 of MLA 410, and/or via shaping of the beam profiles 410, 412, and 414 as discussed with respect to FIG. 5, below.

Figure 5:
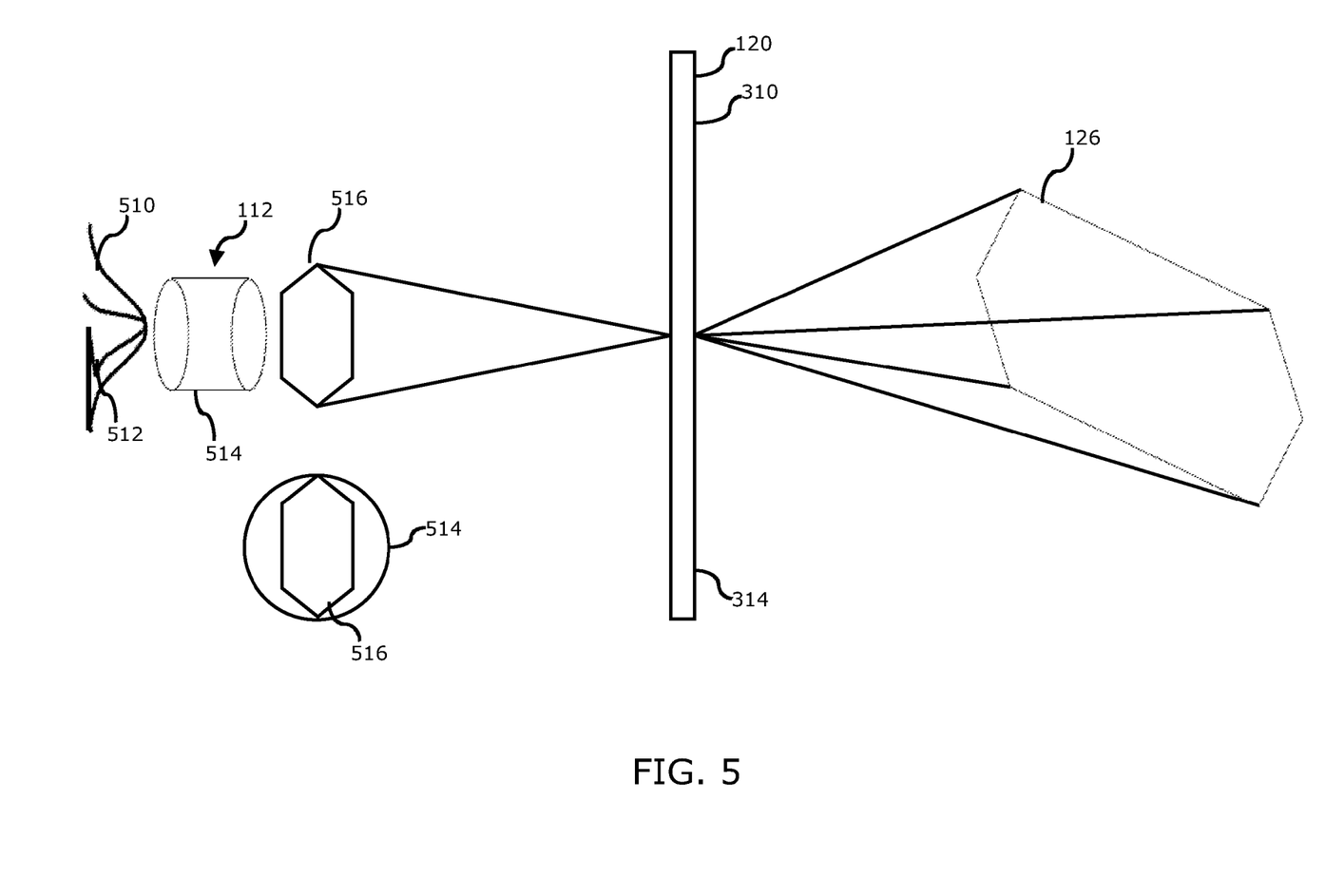
FIG. 5 is a diagram of an optical system for a scanned beam display system capable of providing a desired eyebox aspect ratio in accordance with one or more embodiments.

Referring now to FIG. 5, a diagram of an optical system for a scanned beam display system capable of providing a desired eyebox aspect ratio in accordance with one or more embodiments will be discussed. The basic concept of a compressed MLA solves the eyebox shape problem to result in an eyebox 126 having a shape tailored to a desired aspect ratio. However, if the beam shaping optics 112 of the light source module, comprising laser source 110 and beam shaping optics 112, include a round top-hat output optic, efficiency may suffer. Thus, beam shaping optics 112 can be designed such that a top-hat output correlates to the desired aspect ratio of high Fill factor beamlets formed within eyebox 126 at the output of beam shaping optics 112 so that the efficiency loss due to an appropriately shaped system-clipping-aperture, for example a compressed hexagon, ellipse, or rectangle, may be minimized. Depending on uniformity requirements, a moderate truncation ratio can be considered for use in laser source 110 as well as in the top-hat converter optic of beam shaping optics 112. Beam cone NAs can be defined according to the diffraction pattern beamlet NAs and beamlet layout within the eyebox resulting from the interference of diffraction envelopes due to layout and shape of lenslets 314 in order to maintain high Fill Factor F.

An example of the lenslet shape, eyebox shape, and resulting beamlet layout is illustrated in FIG. 5. Note that the beamlet layout can now be used to dictate a desirable system clipping aperture and orientation which will help increase high Fill Factor F. For example, EPE 120 may include a compressed MLA 310 as shown in FIG. 3 comprising an array of compressed lenslets 314 generally having a hexagonal shape. The hexagonal lenslets 414 my provide a hexagonally shaped clipping aperture 516 which when applied to a laser beam 114 having a circularly shaped profile may clip some of the power of the laser beam having a circular cross section 514. Thus, power of the laser beam 114 in its circular cross section 514 falling outside the hexagonally shaped clipping aperture 516 may be wasted power. In one or more embodiments it may be possible to capitalize on a dynamic Moiré condition in such an arrangement in order to reduce or minimize Moiré and/or tiling artifacts. Such embodiments would allow a spotsize in the faster scan dimension of laser beam 114 in raster scan 118 to be reduced to less than optimum for higher Fill Factor F while maintaining the spotsize along the slower scan dimension. Such an arrangement would be beneficial for efficiency since it would not be required to force an elliptically shaped spot system clipping aperture 516, and thus no changes in the beam shaping optics would be required. In addition such an arrangement would also result in increased light efficiency without the requiring an elliptically shaped clipping aperture 516.

In one or more embodiments wherein a higher Fill Factor and higher uniformity are provided, higher efficiency can be regained via utilization of an elliptical top-hat output element 514 in beam shaping optics 112, or and/or by providing an output element 514 in beam shaping optics 112 having a shape closer to that of an ideal clipping aperture dictated by beamlet layout within eyebox 126. Note that when the desired aspect ratio of an eyebox 126, and thus beamlet and clipping aperture shape, approximate that of a laser diode in laser source 110 having and elliptical NA output aspect ratio, it may be possible to capitalize on the resulting output exit cone shape and therefore simplify the beam shaping optics 112 needed to achieve a higher Fill Factor F. In one or more embodiments, the aspect ratios of the profiles 510 and/or 512 of the laser beam 114, could be sufficiently matched with the aspect ratio of the lenslets 314 and thus the resulting eyebox 126 may result in an arrangement in which a circularizer optic in beam shaping optics 112 is not required. In other words, typically a laser diode emits a beam having an elliptical shaped cross section that is circularized by a circularizer optic in beam shaping optics 112. However, since it is desired to provide an eyebox 126 having an aspect ratio where the width is greater than its height, the scanned beam display 100 may take advantage of the elliptical shape of the laser beam 114 to provide a higher efficiency by eliminating the circularizer optic from the beam shaping optics 112, although the scope of the claimed subject matter is not limited in this respect. In one or more embodiments, although the aspect ratio of the input beam may be similar to the lenslet and thus eyebox shape, the input beam typically needs to be oriented orthogonal to the lenslet orientation wherein longer axis of beam at MEMS will be taller than wide, while at the lenslet the beam will be wider than tall, and then the spotsize formed from the beam focused from the MEMS scanner at the EPE will be wider than tall and thus be generally aligned with the shape of the lenslets to prove a higher fill factor in the lenslets.

In one or more embodiments, a variety of top-hat converters and combinations thereof may be considered for utilization in beam shaping optics 112: a 1-dimensional top-hat converter 514 may be used for capitalizing on dynamic Moiré; a 2-dimensional elliptical Gaussian-to-elliptical top-hat output converter 514 may be utilized with a compressed MLA 310 in EPE 120 for HUD type applications; a 2-dimensional circularized-Gaussian-to-elliptical top-hat converter 514; two crossed 1-dimensional top-hat converters 514; 1-dimensional top-hat converter 514 with orthogonal clipping, and so on. Note also that conjugate focus effects on either or both ends of the converter 514 can be implemented, for example using a Gaussian-to-top-hat converter. However, these are merely examples of the types of converters 415 that may be utilized in beam shaping optics to achieve a desired amount of efficiency with a compressed MLA 310, and the scope of the claimed subject matter is not limited in these respects.

In one or more embodiments, when using the arrangements as described, above, the spot shape at EPE 120 may become somewhat elliptical due to the aspect ratio of the exit cone forming the spot. Furthermore, an ideal shape of the beamlets as defined by beamlet layout centroids may also become compressed. Relative orientations of compressed microlens arrays 310 and the corresponding output eyebox shapes 318 of both hexagonal as well as rectangular are shown in and described with respect to FIG. 2 and FIG. 3 for a given focal length, and are shown as relative indicators of expected relative output size of eyebox 126 for a given focal length of the compressed MLA. The focal length of the given MLA and/or the shape of the lenslets of the MLA may be selected according to the type of application, for example to be tailored to a HUD type display application, however many combinations are possible depending on the desired application, and the scope of the claimed subject matter is not limited in these respects.

Figure 6:
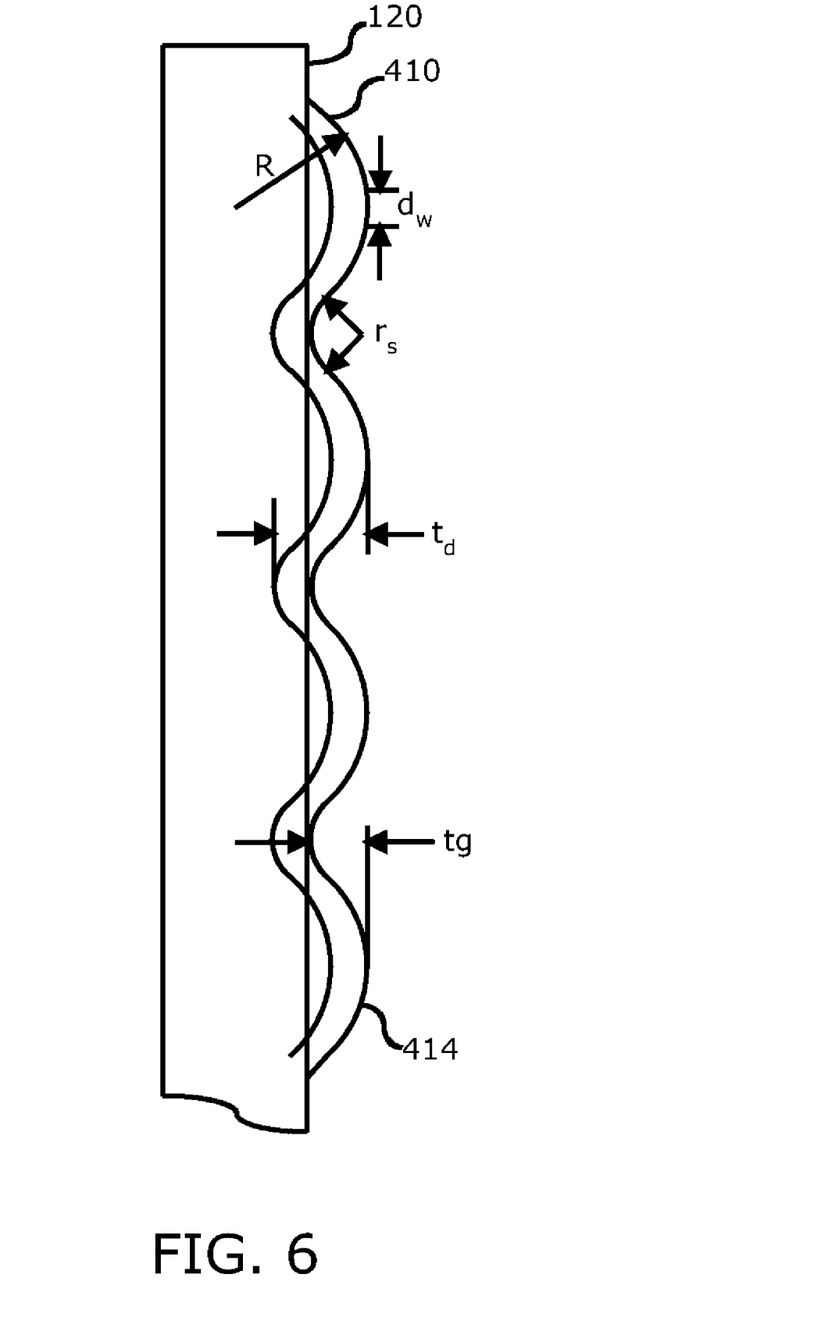
FIG. 6 is a profile view of a compressed microlens array for a scanned beam display system comprising an array of compressed lenslets for a scanned beam display system capable of providing a desired eyebox aspect ratio in accordance with one or more embodiments.

Referring now to FIG. 6, a profile view of a compressed microlens array for a scanned beam display system comprising an array of compressed lenslets for a scanned beam display system capable of providing a desired eyebox aspect ratio in accordance with one or more embodiments will be discussed. As shown in FIG. 6, EPE 120 may comprise a microlens array 410 having a plurality of lenslets 414 wherein the lenslets are shaped and/or spaced to provide a compressed MLA 410. Thus, the vertical spacing of the centers of lenslets 414 may be compressed with respect to the horizontal spacing of the centers of lenslets 414 as shown in and described with respect to FIG. 2 and FIG. 3. Furthermore, lenslets 414 may be designed with a desired radius (R), flat-top width ($d_w$), seam radius ($r_s$), diagonal sag ($t_d$), and/or grid sag ($t_g$) to appropriately shape the resulting diffraction patterns 416, 418, and 420 as shown in FIG. 4 to result in an overall diffraction pattern 132 that provides a desired shape of eyebox 126. In one or more embodiments, for a dual MLA case, minimized seam radius $r_s$ and/or flat-top width $d_w$ may help achieve greater performance. Typically, deviations from and ideal lenslet profile may result in non-uniform intensity fluctuation across the eyebox 126. In some embodiments, having non-minimized seams radius and/or flat-top width may be a useful design parameter, for example in applications in which moderate uniformity may be achieved from an EPE having a single MLA. As but one example, compressed MLA 410 may be about 130 mm in a horizontal direction and may be about 100 mm in a vertical direction, and have a thickness of about 1.1 mm, although the scope of the claimed subject matter is not limited in this respect. In one or more embodiments EPE 120 may comprise a single compressed MLA 410. In one or more alternative embodiments, EPE 120 may comprise a dual MLA, where one or both of the MLAs comprises a compressed MLA 410. A dual MLA arrangement is shown in and described with respect to FIG. 7, below.

Figure 7:
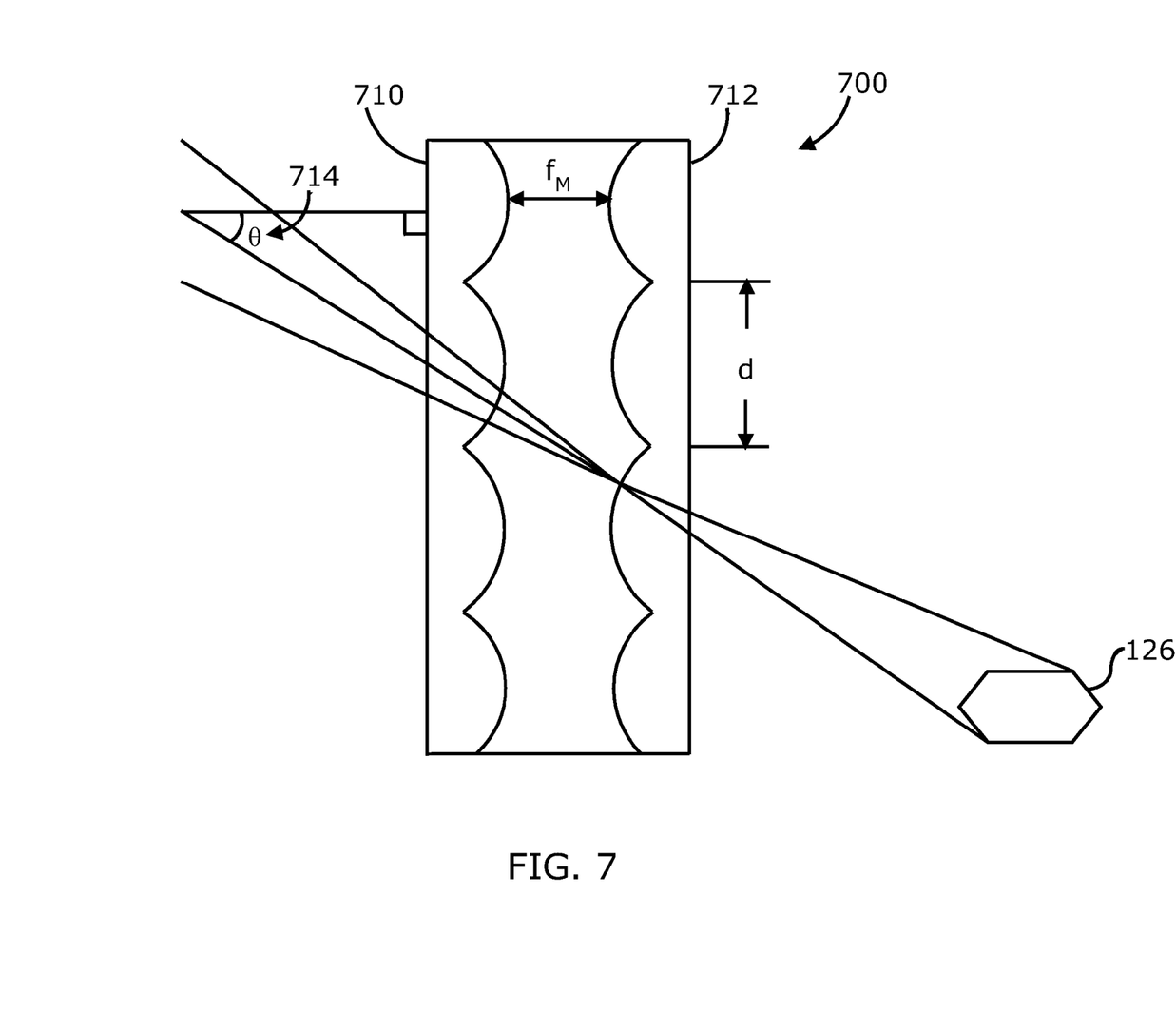
FIG. 7 is a profile view of a compressed dual microlens array for a scanned beam display system comprising an array of compressed lenslets for a scanned beam display system capable of providing a desired eyebox aspect ratio in accordance with one or more embodiments.

Referring now to FIG. 7, a profile view of a compressed dual microlens array for a scanned beam display system comprising an array of compressed lenslets for a scanned beam display system capable of providing a desired eyebox aspect ratio in accordance with one or more embodiments will be discussed. In one or more embodiments, two compressed MLAs 710 and 712 may be utilized in a double-pass dual MLA arrangement in a single EPE 700 as shown in FIG. 7. In one or more particular embodiments, the dual microlens arrays 710 and 712 may be tangibly embodied in the form of a double-sided molded single element wherein MLA 710 and MLA 712 are formed from the same piece of material such as a molded polymer or the like. Alternatively, MLA 710 and MLA 712 may be fabricated as separate units that are combined together into a single unit via an optically transparent adhesive or the like. In one or more embodiments, such a dual MLA EPE 120 may provide a hopped eyebox effect via utilization of a relative tilt of the input scan angle bias (θ) 714 as shown. In one or more embodiments, eyebox hopping may refer to a characteristic of the dual MLA EPE which occurs when an input beam has angle of incidence just outside the exit NA of the EPE, dual MLA or reflective double-pass MLA over reflector. In one or more embodiments, the input scan angle bias 714 may involve a relative transverse shift of MLAs 710 and 712 and/or a bias relative tilt of the scan input with respect to EPE 700, or a combination of both. Such a hopped eyebox effect may be utilized, for example, to diminish ambient reflections such as sunlight where scanned beam display 100 is deployed in a HUD display of vehicle, an example of which is shown in and described with respect to FIG. 8, below. Both single MLA and dual MLA configurations may be utilized in EPE 700. In general, uniformity of the displayed image may be better with a dual MLA EPE 700. Also, a dual MLA EPE 700 is capable of trading off beam-steering with input angle bias 714 of the full scan. In one or more embodiments, a prism shaped substrate (not shown) may be provided for the scan-side MLA 710, and a flat shaped substrate may be provided for the output side MLA 712 so as to simplify the mechanics of the MEMS scan engine 116 while providing a bias angle on the output cone chief ray as input to the projection relay optics 122, although the scope of the claimed subject matter is not limited in these respects. In one or more alternative embodiments, a non-telecentric EPE (not shown) can be created with a compressed MLA EPE in a similar fashion as a regular-tiled EPE. In addition, the two dissimilar pitch MLAs required for forming a non-telecentric dual MLA EPE can be appropriately spaced in tandem, or molded appropriately on each side of a single element. Furthermore, a compressed MLA arrangement as discussed herein may also incorporate phase shifting by providing a periodic MLA with ordered phase shifts, although the scope of the claimed subject matter is not limited in these respects.

Figure 8:
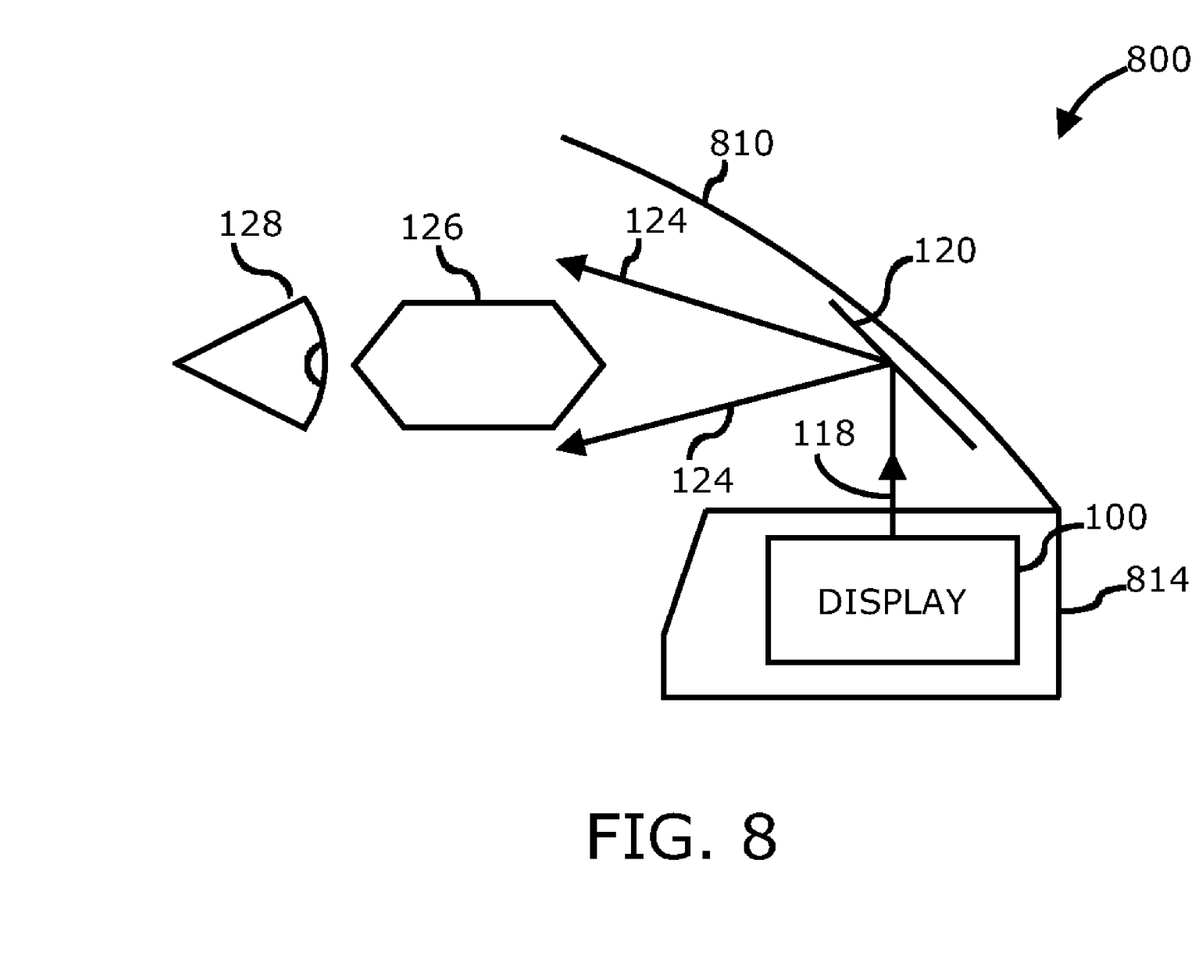
FIG. 8 is a diagram of a vehicle having a head-up display comprising a scanned beam display and a compressed microlens array capable of providing a desired eyebox aspect ratio in accordance with one or more embodiments.

Referring now to FIG. 8, a diagram of a vehicle having a head-up display comprising a scanned beam display and a compressed microlens array capable of providing a desired eyebox aspect ratio in accordance with one or more embodiments will be discussed. As shown in FIG. 8, vehicle 800 may deploy scanned beam display 100 in a HUD-type arrangement, for example so that the operator of vehicle can view vehicle instrument data while simultaneously looking through windshield 810 of vehicle 800. In one or more embodiments, display 100 may be mounted in the dashboard 814 of vehicle 800 and project a raster scan 118 of a displayed image onto EPE 120. In the embodiment shown, EPE 120 may be partially reflective to reflect the raster scan 118 via output cone into eyebox 126, and partially transmissive so that the viewer may see through EPE 120 and through windshield 810 into the environment outside of vehicle 800. In alternative embodiments, EPE 120 may be transmissive and disposed within dashboard 814 and/or otherwise in or proximate to display 100 wherein windshield 810 itself is used as a reflective surface to reflect raster scan 118 off windshield 810 and into eyebox 126 so that the image is viewable by the viewer's eye 128. Thus, in one or more embodiments, EPE 120 may comprise one or more compressed MLAs, for example MLA 310 of FIG. 3 comprising an array of compressed hexagonally shaped lenslets 314 to result in an eyebox 126 having an aspect ratio wherein the width of eyebox 126 is greater than the height of eyebox 126 as discussed herein. As a result, vehicle 800 may comprise a scanned beam display having a compressed MLA to result in an eyebox having a desired shape and/or aspect ratio via virtual vignetting. However, this is merely one example deployment of a compressed MLA to achieve a desired eyebox shape in a scanned beam display, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to eyebox shaping through virtual vignetting and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A compressed microlens array, comprising:
   an array of lenslets, the lenslets having a lenslet center;
   the lenslets being arranged in the array to have the lenslet centers spaced apart at a first distance in a first direction and to have the lenslet centers spaced apart at a second distance in a second direction, the first direction being greater than the second direction;
   wherein a raster scan of an image projected onto the array of lenslets results in the image being displayed in an eyebox having an aspect ratio having a length in the first direction being longer than a length in second direction via virtual vignetting of the diffraction patterns resulting from the raster scan.

2. A compressed microlens array as claimed in claim 1, the first direction being generally orthogonal to the second direction.

3. A compressed microlens array as claimed in claim 1, the lenslets being capable of providing an effective shaping aperture for an input beam utilized to generate the raster scan.

4. A compressed microlens array as claimed in claim 1, the lenslets having a shape selected to provide a corresponding shape to the eyebox.

5. A compressed microlens array as claimed in claim 1, the lenslets having a shape being generally compressed in the second direction with respect to the first direction.

6. A compressed microlens array as claimed in claim 1, the lenslets generally having one or more of the following shapes: ellipse, rectangle, hexagon, rotated hexagon, octagon, or combinations thereof.

7. An exit pupil expander, comprising:
   a compressed microlens array, the compressed microlens array comprising:
      an array of lenslets, the lenslets having a lenslet center;
      the lenslets being arranged in the array to have the lenslet centers spaced apart at a first distance in a first direction and to have the lenslet centers spaced apart at a second distance in a second direction, the first direction being greater than the second direction;
      wherein a raster scan of an image projected onto the array of lenslets results in the image being displayed in an eyebox having an aspect ratio having a length in the first direction being longer than a length in second direction via virtual vignetting of the diffraction patterns resulting from the raster scan.

8. An exit pupil expander as claimed in claim 7, the first direction being generally orthogonal to the second direction.

9. An exit pupil expander as claimed in claim 7, the lenslets being capable of providing an effective shaping aperture for an input beam utilized to generate the raster scan.

10. An exit pupil expander as claimed in claim 7, the lenslets having a shape selected to provide a corresponding shape to the eyebox.

11. An exit pupil expander as claimed in claim 7, the lenslets having a shape being generally compressed in the second direction with respect to the first direction.

12. An exit pupil expander as claimed in claim 7, the lenslets generally having one or more of the following shapes: square, ellipse, rectangle, hexagon, rotated hexagon, octagon, or combinations thereof.

13. An exit pupil expander as claimed in claim 7, further comprising an additional compressed microlens array such that exit pupil expander comprises a dual microlens array exit pupil expander.

14. A scanned beam display, comprising:
   a light source capable of emitting a beam of light;
   a microelectromechanical system (MEMS) scanner capable of generating a raster scan of an image by reflecting the beam of light emitted from the light source as the raster scan; and
   an exit pupil expander being capable of projecting the image into an eyebox in response to the raster scan being scanned on the exit pupil expander with the MEMS scanner, the exit pupil expander comprising a compressed microlens array, the compressed microlens array comprising:
      an array of lenslets, the lenslets having a lenslet center;
      the lenslets being arranged in the array to have the lenslet centers spaced apart at a first distance in a first direction and to have the lenslet centers spaced apart at a second distance in a second direction, the first direction being greater than the second direction;
      wherein the raster scan of the image projected onto the array of lenslets results in the image being displayed in the eyebox having an aspect ratio having a length in the first direction being longer than a length in second direction via virtual vignetting of the diffraction patterns resulting from the raster scan.

15. A scanned beam display as claimed in claim 14, the first direction being generally orthogonal to the second direction.

16. A scanned beam display as claimed in claim 14, the lenslets being capable of providing an effective shaping aperture for an input beam utilized to generate the raster scan.

17. A scanned beam display as claimed in claim 14, the lenslets having a shape selected to provide a corresponding shape to the eyebox.

18. A scanned beam display as claimed in claim 14, the lenslets having a shape being generally compressed in the second direction with respect to the first direction.

19. A scanned beam display as claimed in claim 14, the lenslets generally having one or more of the following shapes: square, ellipse, rectangle, hexagon, rotated hexagon, octagon, or combinations thereof.

20. A scanned beam display as claimed in claim 14, further comprising an additional compressed microlens array such that exit pupil expander comprises a dual microlens array exit pupil expander.

21. A scanned beam display as claimed in claim 14, further comprising:
beam shaping optics being capable of shaping the beam of light emitted from the light source, wherein the beam shaping optics do not require a circularizer to circularize the light beam.

22. A scanned beam display as claimed in claim 14, wherein the beam of light emitted from the light source has an elliptical cross section, wherein the elliptical cross section of the beam of light is generally aligned with a shape of the lenslets to provide a higher fill factor in the lenslets.

23. A scanned beam display as claimed in claim 14, further comprising:
beam shaping optics being capable of shaping the beam of light emitted from the light source, the beam shaping optics comprising a top-hat converter element having a shape or an aspect ratio, or combinations thereof, approximately equal to a desired shape or aspect ratio, or combinations thereof, of the eyebox.

24. A vehicle, comprising:
a windshield; and
a scanned beam display capable of projecting in an eyebox being viewable by a viewer in the vehicle by looking through the windshield, the scanned beam display comprising:
a light source capable of emitting a beam of light;
a microelectromechanical system (MEMS) scanner capable of generating a raster scan of an image by reflecting the beam of light emitted from the light source as the raster scan; and
an exit pupil expander being capable of expanding pixel energy within the image into an eyebox in response to the raster scan being scanned on the exit pupil expander with the MEMS scanner, the exit pupil expander comprising a compressed microlens array, the compressed microlens array comprising:
an array of lenslets, the lenslets having a lenslet center;
the lenslets being arranged in the array to have the lenslet centers spaced apart at a first distance in a first direction and to have the lenslet centers spaced apart at a second distance in a second direction, the first direction being greater than the second direction;
wherein the raster scan of the image projected onto the array of lenslets results in the image being displayed in the eyebox having an aspect ratio having a length in the first direction being longer than a length in second direction via virtual vignetting of the diffraction patterns resulting from the raster scan.

25. A vehicle as claimed in claim 24, the first direction being generally orthogonal to the second direction.

26. A vehicle as claimed in claim 24, the lenslets being capable of providing an effective shaping aperture for an input beam utilized to generate the raster scan.

27. A vehicle as claimed in claim 24, the lenslets having a shape selected to provide a corresponding shape to the eyebox.

28. A vehicle as claimed in claim 24, the lenslets having a shape being generally compressed in the second direction with respect to the first direction.

29. A vehicle as claimed in claim 24, the lenslets generally having one or more of the following shapes: square, ellipse, rectangle, hexagon, rotated hexagon, octagon, or combinations thereof.

30. A vehicle as claimed in claim 24, further comprising an additional compressed microlens array such that exit pupil expander comprises a dual microlens array exit pupil expander.

31. A vehicle as claimed in claim 24, further comprising:
beam shaping optics being capable of shaping the beam of light emitted from the light source, wherein the beam shaping optics do not require a circularizer to circularize the light beam.

32. A vehicle as claimed in claim 24, wherein the beam of light emitted from the light source has an elliptical cross section, wherein the elliptical cross section of the beam of light is generally aligned with a shape of the lenslets to provide a higher fill factor in the lenslets.

33. A vehicle as claimed in claim 24, further comprising:
beam shaping optics being capable of shaping the beam of light emitted from the light source, the beam shaping optics comprising a top-hat converter element having a shape or an aspect ratio, or combinations thereof, approximately equal to a desired shape or aspect ratio, or combinations thereof, of the eyebox.

34. An exit pupil expander, comprising:
a first a compressed microlens array, the first compressed microlens array comprising a first array of lenslets having a lenslet center being arranged to have the lenslet centers in the first array spaced apart at a first pitch; and
a second compressed microlens array, the second compressed microlens array comprising a second array of lenslets having a lenslet center being arranged to have the lenslet centers in the second array spaced apart at a second pitch, wherein the first pitch is different than the second pitch;
wherein a raster scan of an image projected onto the first compressed microlens array and the second compressed microlens array results in the image being displayed in an eyebox having an aspect ratio having a length in the first direction being longer than a length in second direction via virtual vignetting of the diffraction patterns resulting from the raster scan.

35. An exit pupil expander as claimed in claim 34, the lenslets of the first compressed micro lens array or the second compressed microlens array, or combinations thereof, being capable of providing an effective shaping aperture for an input beam utilized to generate the raster scan.

36. An exit pupil expander as claimed in claim 34, the lenslets having a shape selected to provide a corresponding shape to the eyebox.

* * * * *